United States Patent [19]

Burk et al.

[11] 4,017,218
[45] Apr. 12, 1977

[54] DUAL-SPEED SETTING UNDERSPEED SYSTEM

[75] Inventors: Duane L. Burk, East Peoria; Huber A. Moore, Geneva, both of Ill.

[73] Assignee: Caterpillar Tractor Co., Peoria, Ill.

[22] Filed: Mar. 15, 1976

[21] Appl. No.: 666,724

[52] U.S. Cl. .................................. 417/216; 60/428; 60/447

[51] Int. Cl.² .................. F04B 49/00; F16D 31/02

[58] Field of Search .......... 417/216, 218, 219, 222; 60/428, 447, 434

[56] References Cited

UNITED STATES PATENTS

| | | | |
|---|---|---|---|
| 3,672,166 | 6/1972 | Isaac | 60/447 |
| 3,732,036 | 5/1973 | Busbey et al. | 417/216 |
| 3,841,795 | 10/1974 | Ferre et al. | 417/216 |
| 3,884,039 | 5/1975 | Pourian | 60/447 |
| 3,963,378 | 6/1976 | McMillian | 417/216 |

Primary Examiner—Carlton R. Croyle
Assistant Examiner—G. P. La Pointe
Attorney, Agent, or Firm—Phillips, Moore, Weissenberger, Lempio & Majestic

[57] ABSTRACT

A hydraulic power system having a plurality of variable displacement pumps for supplying pressurized fluid for manipulation of an implement includes a control system operative to automatically adjust pump displacement to the output horsepower of a prime mover driving the pumps of the system. The control system includes underspeed valve means responsive to a deviation in the speed of the prime mover from a predetermined normal speed and a selectable second speed to transmit a fluid pressure signal to a servocontrol means for adjusting the displacement of the pumps. The control system includes a valve for selectively conditioning the control system to cause the underspeed valve to respond to a deviation of the selected engine speed and an indicator for indicating the conditioning of the control system.

5 Claims, 2 Drawing Figures

DUAL-SPEED SETTING UNDERSPEED SYSTEM

BACKGROUND OF THE INVENTION

The present invention is directed to hydraulic control systems, and pertains more particularly to a hydraulic control system having a plurality of variable displacement pumps and means for automatically adjusting the displacement of the pumps to changes in engine output.

Many hydraulically actuated implements, such as a hydraulic excavator, normally employ a plurality of variable displacement pumps for supplying the high-pressure hydraulic fluid necessary to power the many motors employed in manipulating the excavator bucket and linkage. Reference is made to U.S. Pat. No. 3,841,795, issued Oct. 15, 1974 to Ferre et al., assigned to the assignee hereof, for background material pertinent to the subject invention. The above patent was developed to overcome certain problems of the prior art and functions very satisfactorily so long as a single predetermined engine speed or engine normal operating speed is selected and maintained.

Earth-moving machines, such as the hydraulic excavator, are normally designed to have a predetermined normal operating speed of the engine during normal operation of the machine. With such machines the engine throttle is normally set at a predetermined position when the machine is in normal operation.

Frequently, it is desirable to operate the vehicle at a lower or higher engine speed than the normal operating speed. This becomes a problem when the hydraulic system is equipped with a control system such as that of U.S. Pat. No. 3,841,795 which is operative to maintain a predetermined output of the hydraulic system to match the output of the engine. With such a system, as soon as the engine speed is reduced, the differential pressure across the underspeed valve orifices would signal the pumps of the system to stroke to a lower displacement as they would react as though the engine was running slower due to lugging such as from a load. Thus, one would be unable with that system to operate the vehicle and/or its implements with the engine at a lower speed and at the same time obtain full pump flow from the pumps.

A system for providing dual speeds of a system is disclosed in application Ser. No. 583,366, filed June 4, 1975, entitled Part Throttle Control - Pump Override, now U.S. Pat. No. 3,963,378 and assigned to the assignee hereof. With such a system, however, it has been found that because of the sensitivity of the underspeed valve, the pressure setting across the valve for the selected operating conditions are critical. Thus, for a selected engine throttle setting the proper pilot control pressure must exist for proper control of the underspeed valve.

SUMMARY AND OBJECTS OF THE INVENTION

It is the primary object of the present invention to provide horsepower controlling means for a hydraulic system that is effective to overcome the above problems of the prior art.

Another object of the present invention is to provide a hydraulic system having horsepower controlling means for a plurality of variable displacement pumps with selective speed-responsive means to adjust the speed-responsive means of the system to first and second predetermined operating speeds with control signal responsive means for indicating the operating speeds.

In accordance with the primary aspect of the present invention, a hydraulic control system having a plurality of variable displacement pumps, and an underspeed valve means responsive to the output of the engine and selective conditioning means for the underspeed valve means so that the system can be adjusted to at least two predetermined operating speeds of the engine is provided with control signal responsive means for indicating the preselected engine speeds.

BRIEF DESCRIPTION OF THE DRAWING

The above and other objects and advantages of the present system will become apparent from the following description when read in conjunction with the drawing wherein.

DETAILED DESCRIPTION OF THE PREFERRED EMBODIMENT

Figure 1:
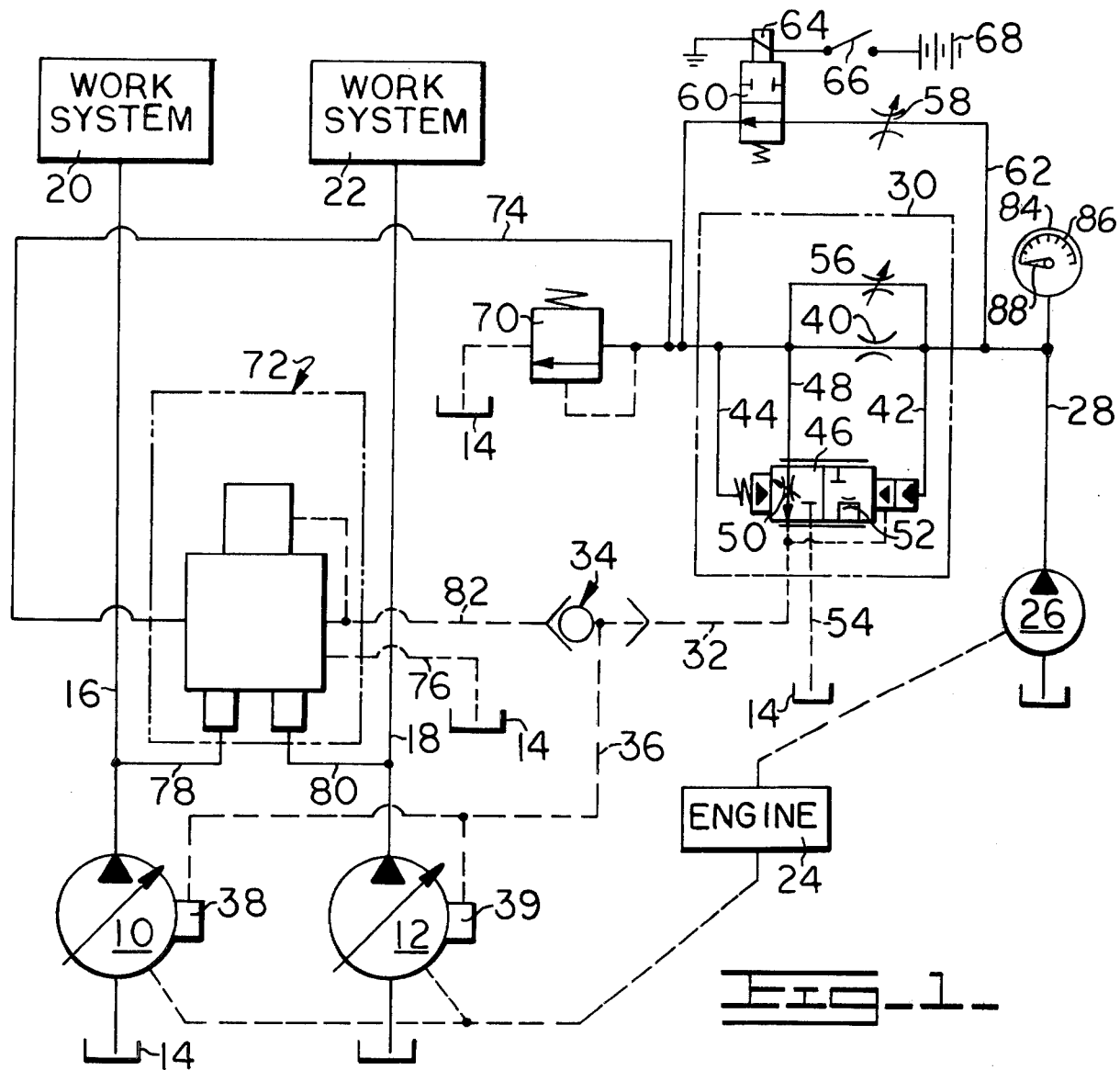
FIG. 1 is a schematic layout of a hydraulic control system embodying the present invention; and, FIG. 2 is a perspective view of a control arrangement for the system of FIG. 1.

Referring to the drawing, a hydraulic control system embodying the present invention is schematically illustrated in operative combination with a multiple pump implement control circuit, a portion of which is illustrated. The implement control circuit is of the type that would be utilized in a machine such as a hydraulic excavator or the like wherein a plurality of hydraulic motors are used in combination individually and/or simultaneously for the manipulation of an implement.

The system comprises a plurality of variable displacement pumps 10 and 12 which draw fluid from a reservoir 14 and supplied by way of output or supply lines or conduits 16 and 18 respectively to work systems 20 and 22. Work systems 20 and 22 may be any suitable arrangement of valves and motors for providing power for operation of implement or the like.

The pumps 10 and 12 are variable displacement pumps and are driven by common prime mover means such as an internal combustion engine 24 which is operatively connected to drive a fixed displacement pump 26 which supplies pilot fluid for performing certain control functions within the system. Among these functions are the control of the variable speed pumps 10 and 12. Pilot fluid from the pump 26 is supplied by way of a pilot supply line 28 to an underspeed valve assembly 30 which is operative under certain conditions to transmit a signal by way of the pilot control line 32, a shuttle valve 34, a pilot control line 36 to servo-control means of actuators 38 and 39 of the pumps 10 and 12 respectively. The servoactuators are responsive to certain pressure signals to reduce the displacement of the respective pumps 10 and 12.

The underspeed valve assembly 30 includes a primary orifice 40 which receives flow by way of conduit 28, causing differential pressure, which pressure is communicated by way of conduits 42 and 44 to a pressure-controlled pilot valve 46. This signal pressure communicated by way of the conduits 42 and 44 acts on pressure-controlled pilot valve 46 to shift it to various positions including the position shown wherein pilot fluid is communicated by way of a passage 48 across the valve to the pilot control line 32 which is then communicated to the pump's servoactuators 38 and 39 for reducing the displacement of the pumps.

The pressure-controlled pilot valve 46 includes a variably restricted passage 50 for communicating between pilot passage 48 and pilot control line 32 when the valve 46 is in a certain position. A restricted passage 52 provides communication between the pilot control line 32 and a return passage 54 to tank 14 for venting passage 32 and pilot control line 36.

The underspeed valve 30 also includes a variable orifice 56 which is operative to adjust the signal pressure for properly positioning the pressure-responsive pilot valve 46 for a predetermined normal operating speed of the engine 24. For example, when the vehicle engine is running at a predetermined normal operating speed, the pilot pump is producing a predetermined amount of flow to the control system. The pressure differential across the orifice 40 is an amount necessary to maintain the pressure-responsive pilot valve 46 in its unloading position, that is, with pilot control line 32 communicating with return passage 54, thus resulting in relieving pressure signal against the servocontrol actuators 38 and 39. As the engine speed drops, the pilot pump 26 begins to slow down and produce less fluid flow than normal through pilot supply line 28 and across orifice 40. The pressure differential across orifice 40 will cause shifting of the pressure-responsive pilot valve 46 to the position, as shown, will communicate a modified pilot pressure to the pump servocontrols 38 and 39 by way of the conduits 48, 32, 34, 36 for the stroking of the pumps 10 and 12 to some angle which will allow the engine to regain its normal speed.

Thus, the underspeed valve assembly 30 is preadjusted to a predetermined maximum or normal operating speed of the vehicle engine 24 for normal operation of the system. As soon as a load acts on the system and loads the engine, causing it to slow down, the underspeed valve assembly immediately signals the pumps 10 and 12 by way of servoactuators 38 and 39 to immediately reduce displacement to permit the engine to regain speed. However, should the operator desire to run the vehicle engine at something less than the maximum predetermined normal operating speed, the underspeed valve assembly 30 would automatically cut back the displacement of pumps 10 and 12 and prevent full flow of fluid therefrom for operation of the work system.

The present system solves the above problem by providing adjustable means in the form of a variable orifice 58 and suitable valve means 60 in parallel with the underspeed valve assembly 30 in a line 62. Thus, with this arrangement, the flow across the underspeed valve assembly 30 can be modified without altering the speed of the fixed displacement pump 26 to thereby adjust the underspeed valve for response to a speed of the engine which is at least one other speed different from the normal operating speed.

During normal operation of the vehicle, the valve 60 is in its fluid communicating position, as shown, thus the pressure differential across orifices 40, 56 and 58 establishes a normal signal at the predetermined normal operating speed of the engine 24. However, should the operator wish to run the engine at a speed somewhat less than maximum normal operating speed, the valve 60 may be shifted to the blocking position to maintain a normal signal in the system or underspeed valve assembly 30 at an engine speed somewhat less than normal predetermined operating speed. Thus, as a result of this variable means, the variable orifices are effectively resized to provide the proper amount of pressure during maximum normal speed of the engine and maximum flow of the pilot pump 26. As the engine begins to lug, the pilot flow differential pressure signals the variable displacement pumps 10 and 12 to stroke to somewhat less displacement than previously described. However, if the operator chooses to run the vehicle at a somewhat less than maximum normal predetermined speed, he would signal the two-way normally open solenoid valve 60 to block the flow through the variable orifice 58 and thus establish the right amount of flow through the underspeed valve orifices 40 and 56 so that the pumps would respond as though the engine were still running at full speed. This modification offers to the operator the ability to use his vehicle with the engine running at somewhat less than maximum normal speed and still accomplish his job with full pump flow at that speed. The horsepower control system (underspeed valve) would still respond to changes in the engine speed from that preselected speed to control the output of the pumps 10 and 12 to prevent overloading the engine.

The valve 60 may be actuated in any suitable manner such as, for example, by a solenoid 64, a circuit breaker 66 and a source of current 68. The valve may, of course, be operated by a hydraulic system or by manual means.

A suitable pressure-relief valve 70 is provided in the pilot circuit for preventing overpressurization of the system.

The underspeed valve control arrangement of the present invention may be used in combination with a summing valve arrangement indicated generally at 72. The basic combination of an underspeed valve and a summing valve arrangement is disclosed in U.S. Pat. No. 3,841,795 issued Oct. 15, 1974. The specific details of a suitable summing valve arrangement is shown, for example, in U.S. Pat. No. 3,732,036 issued May 8, 1973. The summing valve 72 is supplied with pilot fluid by way of conduit 74, which pilot fluid is normally directed by the valve by way of the return line 76 to the sump 14. The summing valve in general includes a spool which is normally biased to an open position for normal operating and includes means responsive by way of conduits 78 and 80 to shift the valve spool in response to load pressure in fluid supply conduits 16 and 18. This load pressure is operative to shift the spool to a position to direct pilot fluid by way of conduit 82 to shuttle valve 34 where it communicates by way of pilot control line 36 to the servoactuator means 38 and 39 for stroking the pumps 10 and 12 to a reduced displacement. Thus, when pressure in conduits 16 and 18 rises above a predetermined amount, this pressure is directed to shift the summing valve to a position to signal the pumps 10 and 12 to reduce displacement thereof. This has an effect of reducing the load on the engine and maintaining a suitable power output of the system.

In order for the operator to obtain proper engine throttle setting for the selected operating speed, a pressure-responsive indicator 84 is connected into pilot supply line 28. This indicator is provided with a graduated scale 86 on the face thereof and a movable pointer 88 which is responsive to pressure in line 28 to move to a corresponding position on the scale. The scale 86 may be conveniently marked to indicate pressure or simply a single satisfactory operating position. It will be recalled that valve 46 responds to a certain specified pressure drop between lines 42 and 44. This pressure drop will be a function of the flow of fluid through orifice 40, which depends upon the speed of pump 26 and whether valve 60 is open or closed. Thus, with valve 60 closed it will take one speed of pump 26 to produce the necessary flow, and with valve 60 open it will take another speed of the pump to produce the necessary flow. The same pressure will be indicated at indicator 84 for the two conditions. Thus, the operator simply sets the engine throttle to obtain the proper indication at 84 to insure proper response of the underspeed control system.

For example, a certain system may be designed to operate at an optimum maximum engine speed of 2200 rpm which produces a pressure of 125+5 psi in line 28 with valve 60 open. This optimum setting can then be obtained by adjusting the engine throttle under no-load conditions with valve 60 open until a reading of 125+5 is obtained on indicator 84. Similarly, a lower operating speed of 1400 may be obtained by closing valve 60 and adjusting the engine throttle until this same pressure 125+5 is obtained on the indicator 84.

Figure 2:
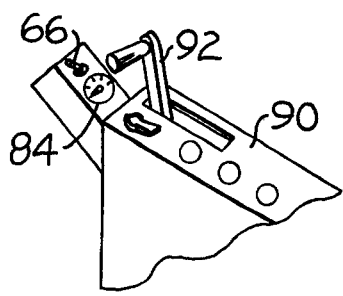

Turning now to FIG. 2 a preferred arrangement of controls is illustrated comprising a console 90 which mounts an engine throttle lever 92, with the switch 66 and the indicator 84 conveniently mounted forward thereof for easy access. With this arrangement, the operator can easily move the switch 66 to the position for the desired speed of operator, and watch the gauge 84 while regulating the throttle lever 92 until he obtains the proper reading on the dial or gauge 84. The underspeed control means is then conditioned to properly respond to any deviation from the selected engine speed to control the displacement of pumps 10 and 12 accordingly.

Thus, from the above description it is seen that there is provided a control system for a hydraulic system having an underspeed valve that is adjustable to a predetermined engine speed and is responsive thereafter to a deviation from that predetermined speed to alter displacement of variable displacement pumps within the system. The system may also include in the combination a summing valve arrangement to provide additional control of the system.

We claim:

1. A hydraulic system comprising the combination of a horsepower-controlling system for controlling the horsepower output of a plurality of variable displacement pumps driven by a single prime mover, a source of pilot pressure including a fixed displacement pump driven by said prime mover for controlling displacement of said pumps in relation to the speed output of said prime mover, underspeed control valve means responsive to a deviation from either one of a predetermined normal operating speed of said prime mover and a second predetermined operating speed less than said normal speed controlling the communication of said pilot control pressure with said pump displacement means to thereby vary the displacement of said pumps in proportion to load thereon, and adjustable means for selectively adjusting said pilot control pressure so that the response of said underspeed valve is to a deviation from a selected one of said normal operating speed and said second operating speed, the improvement comprising pilot pressure-responsive indicator means for indicating said predetermined normal operating speed and said second predetermined operating speed.

2. The hydraulic system of claim 1 wherein:
said adjustable means comprises an orifice connected in parallel with said underspeed control valve means, and a valve for controlling the flow of fluid through said orifice for adjusting the flow of fluid through said underspeed control valve means.

3. The hydraulic system of claim 2 wherein said valve is biased to a first predetermined position for permitting free flow through said orifice and is shiftable to a second position for blocking the flow of fluid through said orifice.

4. A method of adjusting the operation of a hydraulic system comprising the combination of a horsepower-controlling system for controlling the horsepower output of a plurality of variable displacement pumps driven by a single prime mover, a source of pilot pressure including a fixed displacement pump driven by said prime mover for controlling displacement of said pumps in relation to the speed output of said prime mover, underspeed control valve means responsive to a deviation from either one of a predetermined normal operating speed of said prime mover and a second predetermined operating speed less than said normal speed controlling the communication of said pilot control pressure with said pump displacement means to thereby vary the displacement of said pumps in proportion to load thereon, and adjustable means for selectively adjusting said pilot control pressure so that the response of said underspeed valve is to a deviation from a selected one of said normal operating speed and said second operating speed comprising the steps of:
providing pilot pressure-responsive indicator means for indicating said predetermined normal operating speed and said second predetermined operating speed; and,
adjusting the speed of said prime mover until one of said operating speeds is obtained.

5. The method of claim 4 wherein said adjustable means comprises an orifice connected in parallel with said underspeed control valve means and a valve for controlling the flow of fluid through said orifice for adjusting the flow of fluid through said underspeed control valve means, and said method includes the steps of shifting said valve to a first position for permitting free flow through said orifice for selecting one of said operating speeds, and shifting said valve to a second position for blocking the flow of fluid through said orifice for selecting the other of said operating positions.

* * * * *